W. E. McKEE.
STEAM GENERATOR.
APPLICATION FILED AUG. 11, 1911.
1,152,898.
Patented Sept. 7, 1915.
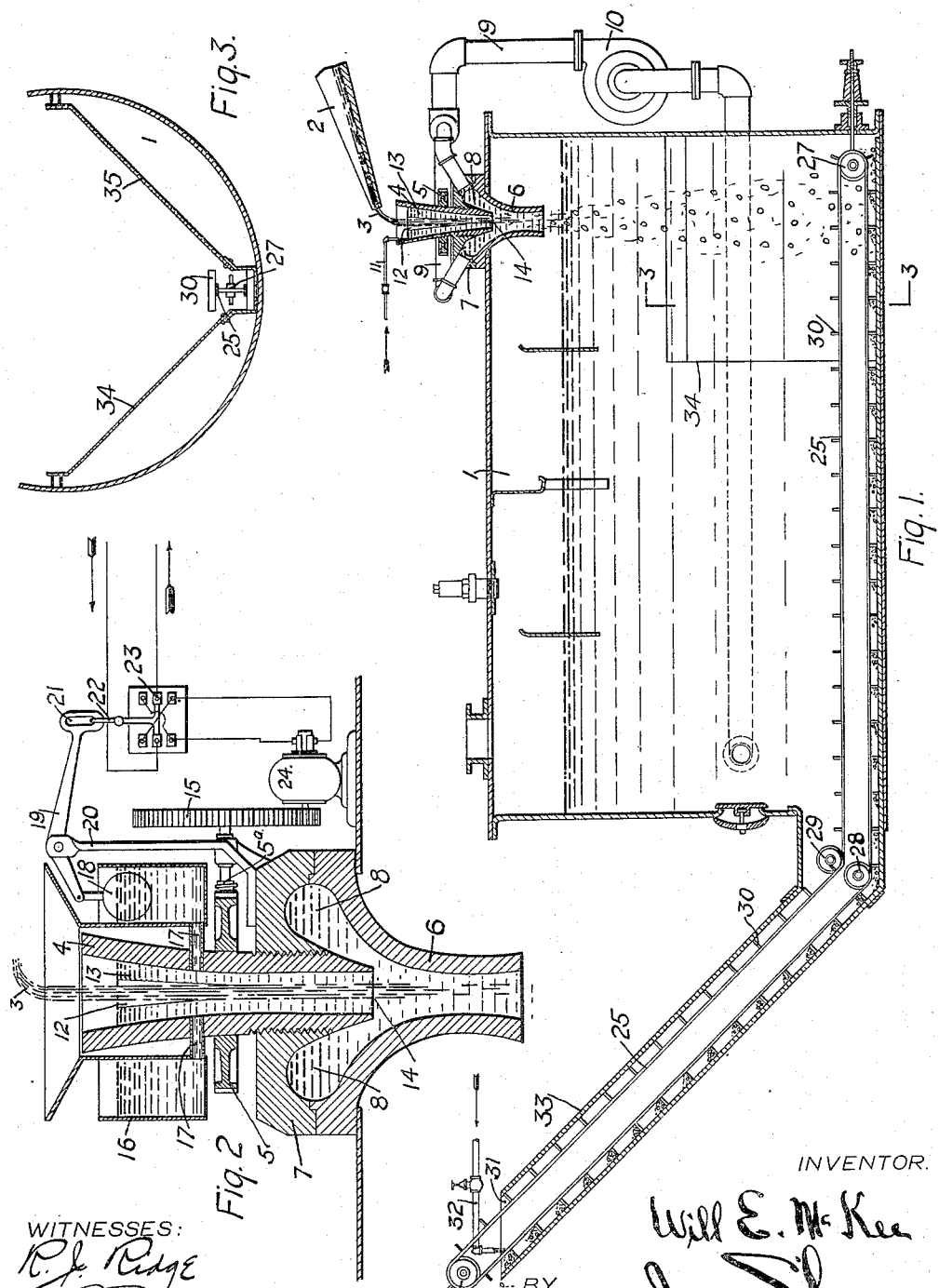
WITNESSES:
INVENTOR.
Will E. McKee
BY
HIS ATTORNEY IN FACT.

UNITED STATES PATENT OFFICE.

WILLIAM E. McKEE, OF WARREN, ARIZONA.

STEAM-GENERATOR.

1,152,898. Specification of Letters Patent. Patented Sept. 7, 1915.

Application filed August 11, 1911. Serial No. 643,555.

*To all whom it may concern:*

Be it known that I, WILLIAM E. McKEE, a citizen of the United States, and a resident of Warren, in the county of Cochise and State of Arizona, have made a new and useful Invention in Steam-Generators, of which the following is a specification.

This invention relates to steam generators, and has reference more particularly to a generator for producing steam from water heated by the introduction into the water of molten slag or like material, the steam being preferably employed at low pressure in turbines or other prime movers, designed for the use of low pressure steam. Such a generator may have a suitable valve controlled inlet for the introduction of molten slag and have a water sealed outlet, through which a conveyer or other similar device may remove the slag.

An object of the invention is to provide a simple and efficient generator for the production of steam from molten slag and other similar waste material which can be delivered to the generator in a highly heated condition, and which is so constructed that steam cannot escape from the generator through the valve.

It is also the purpose of my invention to prevent air from entering the generator through the inlet, and to remove the solid material from the generator without the simultaneous escape of steam therefrom, and to reduce the heat losses to a minimum.

Another object of my invention is to provide means whereby the molten slag or other hot material may be admitted into the boiler or generator against pressure or under vacuum.

In the present embodiment of my invention, I have illustrated a generator, the inlet of which is so constructed that the hot material may be forced into the boiler against pressure or under vacuum, together with water or other fluid, so that the water is injected at the same time as the slag is admitted so that the inlet is sealed against taking air when the boiler or generator is under vacuum.

I have found that when molten slag or other hot material is poured or dropped into quiet water, the slag or other hot material does not at once come into intimate contact with the water and thereby generate a large volume of steam immediately and with explosive violence, as would appear to be the natural result, but the water stands away from the slag and contacts with it only after the slag has been dropped some distance thereinto. The void space, if such it might be termed, which surrounds the slag is probably caused by the evaporation of some of the water into steam; not by convection or direct contact, but by direct radiation, and this highly superheated steam seems to rise around the column of slag, so as to prevent water coming into contact therewith. This theory seems to be substantiated because the space appears to be conical, with the small end of the cone down, that is, the space is in the form of an inverted cone, being larger at the surface of the water. This condition, of course, corresponds to the well known spheroidal condition of water when dropped on hot plates.

In order to secure the head or body of quiet water into which to pour the slag or other material, for the purpose of preventing the air from following the slag or other material into the vortex of the valve, and to get the slag or other material into the vortex of the valve without entraining air which would be detrimental to the operation of condensers, I have designed a novel design, the construction of which forms part of my invention, which will be referred to hereafter.

In the drawings: Figure 1 is a vertical, longitudinal sectional view through a generator or boiler, in accordance with my invention; Fig. 2 is a sectional view through a slightly modified form of valve mechanism; and Fig. 3 is a sectional view on the line 3—3 of Fig. 1.

Referring now to the drawings by numerals of reference, in which like numerals designate corresponding parts in all of the views, 1 is the boiler or receptacle into the inside space of which it is desired to put the slag.

2 designates the spout or trough by means of which the slag 3 is conveyed to the inlet of the boiler.

4 is a funnel or cone which may be adjustable through the medium of a gear 5 by means of which the cone is rotated and made to approach or recede from the nozzle 6, by being raised or lowered in the block 7 through a threaded connection therewith.

8 designates an annular water space by means of which water is supplied to the nozzle 6 through supply pipe 9 and pump 10. The pump as here shown, is taking water from the relatively cool portion of the boiler and thereby assisting in the promotion of circulation within the boiler. It is obvious, however, that water may be taken from any place within or without the boiler. The pipe designated 11 is utilized for supplying a similar volume of water to the funnel 4 to compensate for the loss by evaporation, and to prevent the water in the funnel becoming too warm.

A conical space 12 is formed about the slag or the molten material, as it enters the column of water 13, and this space gradually recedes until the molten slag is in substantial contact with the water before it enters the boiler 1.

In order to maintain a proper head or column of water 13, in the funnel 4, it is desirable to have the funnel 4 adjustable with relation to the nozzle 6, for if funnel 4 is screwed down too close to the nozzle 6, it may cause all the water to be drawn out of the funnel 4, permitting the air to be drawn into the boiler by reason of the partial vacuum which may exist at the point 14, probably due to the injector action of the admission port or valve of the generator. Conversely if funnel 4 is raised too far away from nozzle 6, it will cause too much pressure at 14 and water will rise in funnel 4 and overflow at the top. It is therefore necessary to provide a suitable means for adjusting funnel 4. This may be accomplished manually or automatically.

Following is the method of operation. The pump 10 is first started and a supply of water fed to nozzle 6. Funnel 4 is then adjusted until the desired head or depth of water is maintained in funnel 4. Slag or other hot material is then fed into funnel 4, when it drops down through the water 13 causing space 12 to form about the column of hot material, and the hot material continues to descend in an unbroken column until it comes in contact with the water in nozzle 6 which is moving at a high velocity. The high velocity of the water causes the film of steam to be swept from the column of hot material and the water comes in intimate and violent contact with the hot material, causing a large amount of water to be instantly evaporated into steam and breaking up and granulating the molten material by the violence and rapidity with which steam is generated. The steam is then liberated and separated from the water and slag in the steam space of the boiler and the slag or other material falls to the bottom of the boiler, imparting its remaining heat to the water as it falls, and is removed by the apparatus provided for that purpose.

The funnel requires occasional adjustment to allow for extreme variations in the flow of slag or for considerable variation in the pressure. If this adjustment is not made and if the stream of slag increases very materially, water may overflow at the top, or if adjusted for a large flow and the flow ceases entirely, it may cause the valve to draw in air. It is possible to make this valve large enough to take care of the maximum fluctuations in flow of slag without adjustment, but since the larger valve would require much more water and would therefor require a much larger pump and consume more power for its operation, it is therefore desirable, but not essential, to provide for adjusting the funnel 4 with reference to nozzle 6. As before stated, this may be done either manually or automatically. The adjustment may be manually controlled by means of a worm gear or other suitable device (not shown) engaging gear 5.

A means of accomplishing the adjustment automatically is illustrated in Fig. 2. The gear 5 is here shown as meshing with a worm $5^a$ driven by a gear 15 receiving power from motor 24. 16 is an annular trough surrounding the funnel 4, which is connected to the water space of 4 by means of pipes 17, as shown, so that the same level of water is maintained in both funnel 4 and annular trough 16. In the trough 16, a float 18 is suspended from lever 19 and guided by a stand 20 supported on the stationary part of the valve. This arrangement permits the funnel 4, and attached parts to revolve without disturbing other parts or their adjustment. Lever 19 is also suspended by stand 20 and has the outer end at 21 slotted. To this slot is attached rod 22 which operates reversing switch 23. This switch is so constructed that when one pair of contacts engage, motor 24 operates in one direction and when the other pair engage the motor will operate in the opposite direction. Therefore, if the water in trough 16 raises until the full travel of the lever 19 allowed by slot 21 is reached, any further rise will throw rod 22 so that the contacts on switch engage and the motor revolves in a direction to screw the funnel 4 down by means of the intermediate shafts and gearing. The motor will continue in this direction until the water in 16 lowers sufficiently to cause float 18 to disengage the contacts first put in operation and stop the motor. If the water in 16 should continue to lower, the float 18 would soon cause the other contacts of the switch to close by means of lever 19 and rod 22 and the motor would rotate in the opposite direction and screw funnel 4 up until the water in 16 rose to such a height as to cause float 18 to disengage the switch.

I have shown means for removing the slag from the bottom of the generator. This consists of an endless carrier 25 passing around the pulleys 26 and 27, and around the idlers 28 and 29. The conveyer 25 is provided with slats or projections 30 which act as scrapers to carry slag through the outlet 31.

In order that no steam may escape during the removal of slag. I provide a water seal consisting of a pipe 32 which admits water into a conveyer casing 33, so that liability of the steam leaking out will be avoided. Any well known conveyer which will serve the purpose of my invention may be substituted for the one herein shown. The slag may be guided on to the conveyer by the inclined walls 34 and 35, which constitute a hopper at the bottom of which the slag may accumulate to be removed by the endless carrier 25.

In accordance with the provisions of the patent statutes I have described the principle of operation of my invention, together with the device which I now consider to represent the best embodiment thereof, but I desire to have it understood that the device shown is only illustrative and that the invention can be carried out in other ways.

Having thus described my invention what I claim is:

1. In an inlet device for delivering molten slag to a steam generator, means for maintaining a body of water within the device and around the slag passing therethrough.

2. An inlet device for delivering slag to a steam generator, comprising a cone for delivering a stream of molten slag into the generator, and means for maintaining a body of water between the wall of the cone and the slag passing therethrough.

3. In a steam generator, a casing having an inlet for heated material, and means for maintaining a flow of sealing liquid through said inlet.

4. An inlet device for delivering molten material into a steam generator, comprising a liquid injector and means for feeding molten material through said injector into the generator.

5. In a steam generator, a casing having an inlet for heated material, a nozzle projecting into the inlet and through which the material is adapted to pass into the casing, and means for maintaining a head of sealing liquid in said nozzle and for thereby closing communication between the interior and exterior of the casing.

6. In a steam generator, a steam generating chamber, a nozzle projecting into said chamber and through which heated material is adapted to be delivered, a pressure chamber having an outlet communicating with the interior of the chamber and into which the nozzle projects, and means for delivering a flow of sealing liquid into said chamber and through the outlet thereof to close communication between the interior and the exterior of the generating chamber.

7. In a steam generator, a casing having an inlet formed therein, a liquid delivery nozzle projecting into the casing through the inlet, a second nozzle communicating with the first nozzle, and through which molten material is adapted to be delivered into the casing, means for delivering a flow of liquid to the first mentioned nozzle and for maintaining a head of liquid in the second nozzle, and means for adjusting the position of the second nozzle longitudinally with relation to the first nozzle.

8. In a steam generator, a receptacle having an inlet, means for providing a constant head of water in said inlet and means for admitting molten material through said opening and within said head of water.

9. In a steam generator, a receptacle, a nozzle having a central bore and means for maintaining a column of water in said bore, and means for admitting heated material within the column of water.

10. A steam generator comprising a casing, an inlet formed therein, a nozzle projecting through the inlet and through which molten material is adapted to be introduced into the casing, and a pump receiving water from the interior of the casing for delivering a continuous flow of water past the delivery end of the nozzle and back into the casing.

In testimony whereof, I have hereunto subscribed my name this 31st day of July, 1911.

WILL. E. McKEE.

Witnesses:
WILLIAM F. NASH,
JOHN F. BANKERD.

Copies of this patent may be obtained for five cents each, by addressing the "Commissioner of Patents, Washington, D. C."